United States Patent
Federman

(10) Patent No.: US 6,456,191 B1
(45) Date of Patent: Sep. 24, 2002

(54) TAG SYSTEM WITH ANTI-COLLISION FEATURES

(75) Inventor: Vladimir Federman, Winnipeg (CA)

(73) Assignee: eXI Wireless Systems Inc., Richmond (CA)

( * ) Notice: Subject to any disclaimer, the term of this patent is extended or adjusted under 35 U.S.C. 154(b) by 0 days.

(21) Appl. No.: 09/274,608

(22) Filed: Mar. 23, 1999

(51) Int. Cl.[7] .................................................. H04Q 5/22
(52) U.S. Cl. .................. 340/10.2; 340/572.1; 340/10.3; 340/10.31; 235/385; 235/435; 235/492; 342/42; 342/44; 342/51; 364/140
(58) Field of Search ............................ 340/572.1, 10.2, 340/10.3, 10.31, 314; 235/385, 435, 439, 492; 342/42, 44, 51; 364/140

(56) References Cited

U.S. PATENT DOCUMENTS

| | | | |
|---|---|---|---|
| 4,071,908 A | * 1/1978 | Brophy et al. ............... | 364/900 |
| 4,646,090 A | 2/1987 | Mawhinney .................. | 342/44 |
| 5,008,661 A | 4/1991 | Raj ........................ | 340/825.54 |
| 5,030,807 A | 7/1991 | Landt et al. ................ | 235/375 |
| 5,055,659 A | 10/1991 | Hendrick et al. ........... | 235/439 |
| 5,218,189 A | 6/1993 | Hutchison .................. | 235/439 |
| 5,339,073 A | * 8/1994 | Dodd et al. ............ | 340/825.31 |
| 5,550,547 A | 8/1996 | Chan et al. .................... | 342/42 |
| 5,640,151 A | 6/1997 | Reis et al. ............. | 340/825.54 |
| 5,673,037 A | 9/1997 | Cesar et al. ........... | 340/825.54 |
| 5,686,902 A | 11/1997 | Reis et al. ............. | 340/825.54 |
| 5,726,630 A | 3/1998 | Marsh et al. ............... | 340/572 |
| 5,751,570 A | 5/1998 | Stobbe et al. ............... | 364/140 |
| 5,777,561 A | 7/1998 | Chieu et al. ........... | 340/825.42 |
| 5,940,006 A | * 8/1999 | MacLellan et al. .... | 340/825.54 |
| 6,104,279 A | * 8/2000 | Maletsky .................. | 340/10.41 |

* cited by examiner

Primary Examiner—Michael Horabik
Assistant Examiner—M Shimizu
(74) Attorney, Agent, or Firm—Wood,Herron&Evans, L.L.P.

(57) ABSTRACT

In a system of communicating between a master communication device and a plurality of slave communication devices, the master determines if any of the plurality of slave devices exist within a defined geographic area and, if so sends a bit-by-bit command for the slaves to identify themselves via a unique binary identification number. To avoid collision when the slaves respond, the slaves respond to the master's command within a predetermined period of a time window providing the ID bit by bit. Responses are acknowledged by the master such that only one slave is able to respond with its compute full ID after a bit-by-bit command from the master.

20 Claims, 2 Drawing Sheets

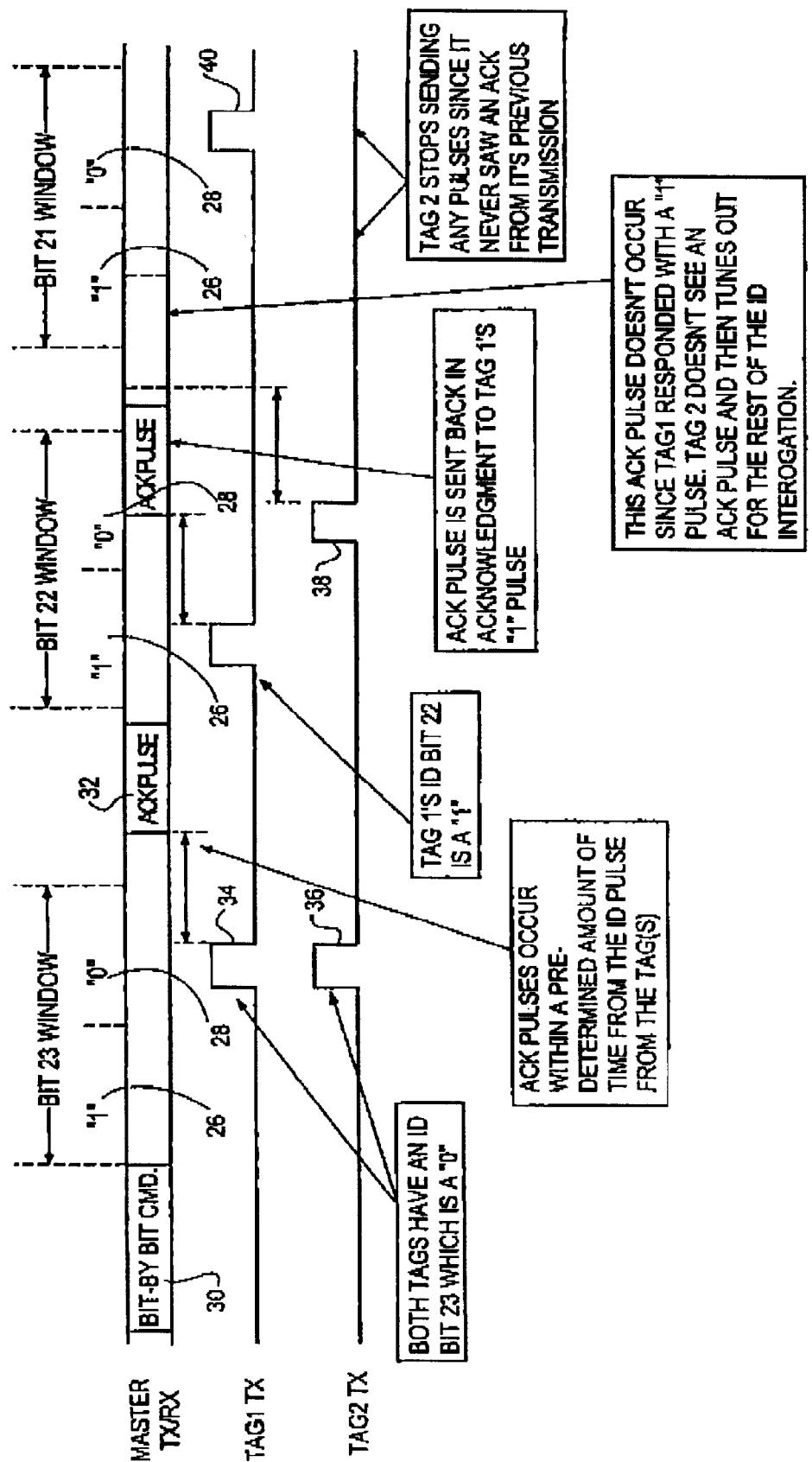

TAG SYSTEM WITH ANTI-COLLISION FEATURES

BACKGROUND OF THE INVENTION

1. The Field of the Invention

The present invention relates to communication devices. Particularly, the present invention relates to a method and apparatus for determining if a plurality of communication devices exist within a defined geographic area and for identifying the communication devices.

2. The Relevant Art

There are known in the art of communication devices, systems for locating and identifying objects or tags that exist within a defined area or field of coverage. The systems serve varying purposes, ranging from protecting assets in a store to recognizing for safety reasons when persons who are mentally challenged enter a particular locale.

Locating and identifying objects in a field of coverage presents particular difficulties for communication systems where a significant quantity of unknown devices must be located, and where each device requires a significantly lengthy unique identification number. At any given point in such systems, there may be numerous slave communication devices within range of a master communication device, with the slave communication devices moving into and out of the field of coverage either simultaneously or independently.

One method to obtain the identification number of the slaves in a master/slave communication system is to sequentially scroll through each possible identification number and interrogate all possible slaves. However, if the possible combination of addresses is great, this process will be extremely cumbersome. For example, in a system having slaves with 24 bit identifiers, the potential number of addresses is 16 million ($2^{24}$).

Alternatively, a slave entering a field, upon detecting that it is within range of the field, could immediately send its identification number to a master. Since multiple tags might enter the field at one time, however, their messages might collide and never reach the master.

Other approaches in the art describe various methods for locating and identifying objects in a field of coverage and for handling collision when multiple objects in a field respond to a single remote interrogator.

U.S. Pat. No. 5,751,570 issued to Stobbe et al. discloses a method of automatically identifying an unknown number of slave devices in a field. The slave devices transmit their corresponding identities to an interrogator. Particularly, the slave devices are transponders that are activated to send data when they are within the electromagnetic field of a reader. When more than one transponder responds upon being activated, all transponders are put into a dead state by a collision signal transmitted by the reader, thereby ceasing transmission of transponder data. Each transponder thereafter generates a random dead state for itself after receiving the collision signal, with each transponder resuming transmission of its transponder data at the end of the dead state. After receiving the data from a transponder as a result of the deviating dead states, the reader transmits an occupied signal to put the remaining transponders in an idle state in which they no longer transmit transponder data due to the occupied signal. After reception of the complete transponder data from the individual transponder, the reader transmits an acknowledge signal to place the transponder into an idle state. The other transponders are reactivated and the process repeated until all transponders have been identified individually and successively by the reader. Such a system would not be efficient in identifying and locating a significant number of transponders having significantly lengthy identification numbers due to the numerous random period dead states required after collision.

U.S. Pat. 5,686,902 issued to Reis et al. discloses a communication device or method wherein an algorithm is used to reduce collision probability between tags. The system provides bit code sequencing techniques during the identification process. Reis requires shorter identification transmission times, as compared to the overall listening time, to reduce the likelihood of collision between tags. If there are a significant number of tags, however, this method requires extremely long listening periods which creates a problem if tags are moving in and out of the field of coverage. Some tags, for example, will have the opportunity to enter the field and leave before the listening period is over. Also, while Reis shortens the listening period as tags are successfully identified, there is still significant inefficiency when there are few tags to be identified and the listening period remains relatively long.

U.S. Pat. No. 5,030,807 issued to Landt et al. discloses an RF tag identification system wherein an interrogator unit is able to identify a tag that enters a field of coverage. The interrogation device provides a bit by bit identification scheme. Particularly, an interrogator sends an RF signal to a remote object where the signal includes data intended to be received and stored by the remote object. Upon receipt of the RF signal, one or more remote objects return a backscatter-modulated signal to the interrogator, the backscatter-modulated signal being modulated with data indicating the identity and other data stored in the remote object. The interrogator has the capability to recognize the identity and other data stored in the remote object from the returned backscatter-modulated signal. The interrogator also has the capability to transmit data to the identified remote object. Landt uses time division multiplexing and multiple frequency schemes to separate tag-to-interrogator and interrogator-to-tag communications, and to separate communications where multiple, interrogators communicate in close proximity with one another. Time-division multiplexing, however, involves an automatic "built-in" delay as each tag in a system must respond, one after another, in time during an interrogation. This built-in delay would be inefficient in a system requiring location and identification. of many unknown tags in a field of coverage at one time. Furthermore, using multiple frequency tags is impractical in a system with numerous tags., Also, while Landt focuses on collision avoidance, Landt does not directly provide a solution when there is- an actual collision between two or more tags responding to the same interrogator.

U.S. Pat. No. 5,673,037 issued to Cesar et al. discloses a method of selecting RF tags for querying, communicating, and/or identifying by an interrogator. The method uses a bit code type control logic algorithm to accomplish these functions. The tags in Cesar are selected and identified in specific groups based on known criteria. Thus, no method for identifying and locating individual unknown tags in a field of coverage is disclosed.

None of the above mentioned prior art systems describe a system or method to effectively handle the situation where numerous unknown slave communication devices enter a field of coverage and thereafter begin providing their respective unique identification numbers simultaneously, thus colliding.

Accordingly, it would be desirable to have a communication system and method for locating and identifying a significant number of unknown devices having unique identification numbers within a field of coverage in an efficient and reliable manner. Particularly, it would be desirable for the same system and method to have an anti-collision feature allowing numerous slave communication devices to simply and efficiently provide unique identification numbers to a master communication device.

SUMMARY OF THE INVENTION

The foregoing desired aspects and advantages are achieved in a system of communicating between a master communication device and at least one slave communication device to determine if there is at least one slave device within a defined geographic area and to identify the slave(s). The system comprises a master communication device that establishes a field of coverage and initiates a request to determine if there are any slave communication devices within the field of coverage. Each slave communication device has a unique binary identification number. After receiving the request, slaves in the defined geographic areas send a response to the master indicating that the. slave is within the defined geographic area. The master after receiving, one or more responses from slaves in the defined geographic area, sends a command to the responding slaves to provide their unique binary identification numbers. After receiving the command, the responding slaves begin providing information representative of bits of their respective unique binary identification numbers to the master.

It is another aspect of the present invention for the information representative of bits of the unique binary identification numbers to be provided by responding slaves within first and second time periods of a plurality of time windows.

It is a further aspect of the present invention for the information representative of bits of the unique binary identification numbers to be provided by responding slaves within the first time period of the time windows to designate a bit that has a first binary value, and within the second time period of the time windows to designate a bit having a second binary value, where the second predetermined time period starts after the first predetermined time period has ended.

It is yet a further aspect of the present invention for the master to send an acknowledgment within a predetermined time period after slave responses received during the first and second time periods of the time windows.

Still another aspect of the present invention is where a first slave responds to the master's command within the first time period of a time window, and a second slave responds to the master's command within the second time period of the time window, and further where only the first slave receives an acknowledgment from the master, the acknowledgment being sent within a predetermined time period after the response from the first slave during the first time period of the window.

Still yet another aspect of the present invention is where a first slave responds to the master within the first or second time period of a time window, and a second slave responds to the master within the same time period of the window, and where both the first and second slaves receive an acknowledgment from the master, the acknowledgment being sent within a predetermined time period after the response from the first and second slaves.

Still a further aspect of the present invention is where the first slave, after receiving the acknowledgment from the master, provides information representative of bits of its unique binary identification number during subsequent time windows.

Other aspects and advantages of the present invention will become apparent when the description of specific embodiments below are read in conjunction with the accompanying figures.

BRIEF DESCRIPTION OF THE DRAWINGS

FIG. 3 illustrates the second phase of the exchange between a master and two tags, whereby the tags, after being determined as within the master's field of coverage, provide their unique binary identification numbers bit-by-bit according to a preferred embodiment of the invention.

DESCRIPTION OF THE PREFERRED EMBODIMENT

The present invention describes a mechanism for a master communication device to locate and identify unknown slave communication devices in a communication system. The slave communication devices are addressed using unique 24 bit identifier numbers. The system assumes a single master and multiple slaves, with the slave identification numbers being unknown to the master. A typical embodiment of a such a system is a RFID (Radio Frequency Identification) tag. system.

Figure 1:
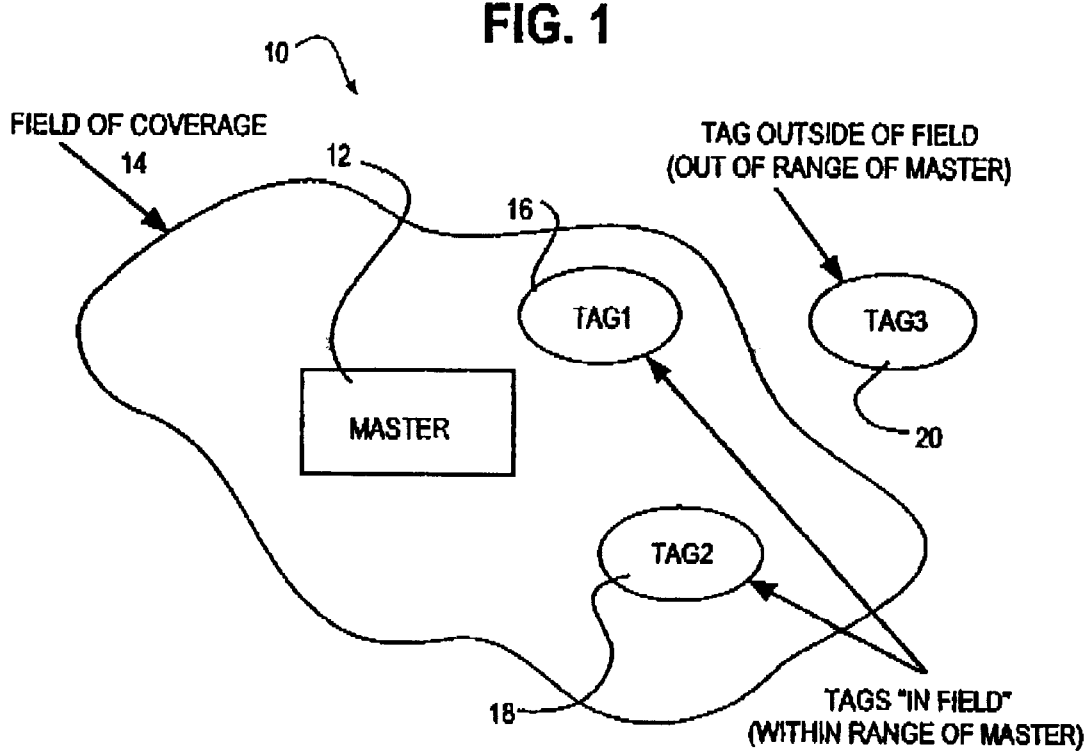
FIG. 1 is a diagram illustrating a field of coverage generated by a master communication device in a master-slave communication system, where the master must locate and identify slaves (tags in the preferred embodiment) that are within the field of coverage.

Referring to FIG. 1, in the preferred embodiment, the system is a wireless two-way radio system 10. In the system 10, a master 12, equipped with a transmitter, and a receiver, generates a radio frequency (RF) field of coverage 14 that defines a particular geographic area by transmitting a constant strength RF signal. Tags 16, 18 and 20 (slaves) can enter or leave the field of coverage 14 at any time, simultaneously with other tags or independently. When a tag enters the field of coverage, it responds to the master's constant RF signal in a fashion detailed further herein. The tags 16, 18 and 20 also are each equipped with means for transmitting and receiving. Tags 16 and 18 are shown within the field of coverage 14. Tag 20 is outside the field of coverage 14. While a radio frequency field of coverage is used in the preferred embodiment, other means for generating a field of coverage, such as electromagnetic energy, could be used without departing from the scope of the present invention. In such a case, the tags would have to be fitted with appropriate receiving and transmitting means. Also, while the master 12 is fixed to define a fixed field of coverage in the preferred embodiment, a mobile master that defines a non-stationary field of coverage could be substituted without departing from the scope of the present invention.

The anti-collision feature of the present invention resolves the problem associated with a plurality of tags entering a field at the same time and provides a mechanism for efficiently handling collision when one or more of these tags simultaneously transmit their identification numbers to the master. This problem is particularly acute where there are a significant number of tags, each requiring a significant length unique binary identification number. In the preferred embodiment, the tags have 24 bit identifiers, meaning that the potential number of tags with unique binary identification numbers is 16 million ($2^{24}$). A large of number of these tags may move in and out of a field simultaneously, increasing the challenge to reliably and efficiently locate and identify the tags.

In the system of the present invention, the entire sequence involved for locating and identifying tags in a field of coverage involves an exchange of information between the master and the tags to determine if the tags are in the field of coverage and, if so, a "bit-by-bit" interrogation of each tag's unique binary identification number.

Figure 2:
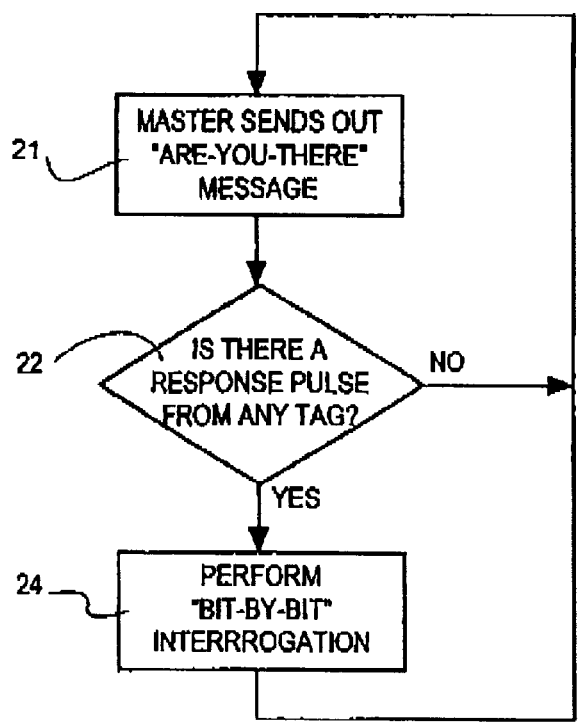
FIG. 2 is a flow chart of the first phase of the exchange between a master and one or more slaves to locate slaves within a field of coverage.

The first phase of the exchange of information between the master and the tag involves the following exchange illustrated in the flowchart of FIG. 2.

At block 21, the master transmits an "are you there" message which is detected by any tag which is within the field of coverage.

At block 22, if there is no response to the "are-you-there" message, then the master knows there are no tags in the field. The master will then wait a short period of time before starting the process over at block 21. If there is a response from any tag, execution continues at block 24.

At block 24, when the master receives a response, the master knows that one or more tags. have entered the field. Since the master cannot tell if the response came from one or more tags, the master begins a bit-by-bit interrogation to identify the tag(s).

In the preferred embodiment the response from any tag in the field is a short transmitted pulse. Upon receiving a transmitted pulse from one or more tags after sending the "are you there message," the master starts a bit-by-bit interrogation of the tags within the field of coverage to identify the tags. The master begins the "bit-by-bit" interrogation by sending out a "bit-by-bit" command to all tags within the field of coverage.

Referring to FIG. 3, the time lines tag 1 TX and tag2 TX illustrate the timing of pulses transmitted by two tags, tag1 and tag2, entering a field of coverage at the same time. The time line master TX/RX illustrates the timing of pulses transmitted and received by a master. The master TX/RX time line also shows the first three time windows (the bit 23 window, the bit 22 window and the bit 21 window) of the exchange between the master and the two tags. The first time window of any exchange between a master and one or more tags begins at a predetermined time period after the master sends the bit-by-bit command. Subsequent time windows begin at a predetermined time period following acknowledged pulses transmitted by tags during an interrogation. While the invention can be adequately explained using three time windows, it should be noted that in the preferred embodiment twenty-four time windows will be required for a tag to transmit its complete 24 bit unique binary identification number to a master.

The time windows each consist of a first time period 26 and a second time period 28. In the preferred embodiment, a pulse received from a tag during a first time period of a time window designates a binary value of "1" for the corresponding bit position, while a pulse received from a tag during a second time period of a time window designates a binary value of "0" for the corresponding bit position. A master will send an acknowledgment pulse within a predetermined time after receiving a pulse during either the first time period or the second time period of a time window, but not both.

If a master receives pulses during the first and second time periods of the same window, the master will only send an acknowledgment pulse within a predetermined period of the pulse received during the first time period. Whenever tags transmit a pulse while responding to a bit-by-bit command, an acknowledgment pulse is expected so that the tags can continue transmitting their unique binary identification numbers. Accordingly, any tags in this case that responded during the first period of the time window will continue transmitting after receiving the expected acknowledgment. On the other hand, any tags that responded during the second time period of the window will enter an idle state, and thus will not transmit further during the current exchange, after failing to receive an expected acknowledgment.

FIG. 3 illustrates the second phase of the exchange between a master and two tags. In FIG. 3, it is assumed that tag1 and tag2 have both responded to an "are you there" message from the master, and are now responding simultaneously to a bit-by-bit command 30 from the master, thereby colliding. At the bit 23 window, both tag1 and tag2 transmit pulses, pulse 34 and 36 respectively, within a second time period 28 of the bit 23 window, designating a binary value of "0" for the bit 23 position of the unique binary identification number of both tags. Within a predetermined time period after the pulses are received by the master, the master sends an acknowledgment pulse 32 indicating that the pulse from the tags was received. Receiving the acknowledgment pulse 32 within a predetermined time period after transmitting the pulses 34 and 36 indicates to tag1 and tag2 that they may continue transmitting pulses representative of the bits of their unique binary identification numbers. According to the invention, any number of tags responding with pulses during the second time period of the bit 23 window would receive the acknowledgment pulse 32 and would thereafter continue transmitting pulses representative of the bits of their respective unique binary identification numbers.

Tag2 will abort its exchange with the master when it fails to see an acknowledgment pulse in response to its "0" pulse 38 in the bit 22 window. The early acknowledgment pulse in the bit 22 window indicates that the master has detected another tag, in this case the transmitted pulse 40 from tag1 in the time, period 26 of bit 22 window. The master then does not send tag2 the acknowledgment that it expects in response to the pulse 38 that it sent. When tag2 does not receive an acknowledgment within a predetermined time after sending pulse 38, tag2 enters an idle state and will send no more responses to the master during the current "bit-by-bit" exchange. This allows tag1 to continue its exchange with the master and complete its identification process, as indicated by the transmitted pulse 40 from-tag1 during the bit 21 window. Regardless of the number of tags responding during a given exchange after a bit-by-bit command, only one tag; in this case tag1, will succeed in transmitting its unique 24-bit binary identification number to the master after 24 time windows. The present invention also ensures that one tag will actually succeed during every exchange. after a bit-by-bit command, collision notwithstanding.

Tag2 in FIG. 3 will remain idle until it receives a new "are-you-there" message and a new "bit-by-bit" command while in the field of coverage, and thereafter will begin re-transmitting its unique binary identification number back to the master. Similar to tag2, any number of tags responding with pulses during the second time period 28 of the bit 22 window would not receive an expected acknowledgment pulse and would enter an idle state, whereby the respective tags would send no further responses to the master during the current "bit-by-bit" exchange.

Tag1 continues responding to the interrogation until all 24 bits of its unique binary identification number have been communicated to the master. A verification is performed between the master and tag1 confirming that the correct ID has been transmitted, and if so, tag1 will consider itself "identified" and will no longer need to respond to subsequent "are-you-there" messages and "bit-by-bit" commands from the master. Accordingly, tag1 will not interfere while the master proceeds to identify all other tags in the field. To accomplish this, the process starts over with the master issuing new "are you there" messages and new "bit-by-bit" commands until all tags in the field of coverage have been identified.

A tag that considers itself "identified" remains in this mode until it fails to see a new "are you-there" message from the master within a specific period of time. If this occurs, the tag knows it is no longer in the field of coverage and then returns to the "un-identified" state. If the tag re-enters the field of coverage it will then respond to subsequent "are you there" messages and "bit-by-bit" commands in the same fashion as described before.

Although certain embodiments and examples have been used to describe the present invention, it will be apparent to those of skill in the art that various changes can be made to the embodiments and examples -without departing from the scope or spirit of the invention.

I claim:

1. A system of communicating between a master communication device and at least one slave communication device for determining if said at least one slave is within a field of coverage and for identifying said slave, the system comprising:

a master communication device having transmitting and receiving means, said master establishing a field of coverage and initiating communications with slave communication devices within said field of coverage;

at least one slave communication device having transmitting and receiving means and a binary identification number, said at least one slave communicating with said master to provide said binary identification number; and said master sending a command to said at least one slave for said at least one slave to provide said binary identification number, and said at least one slave receiving said command and providing information representative of bits of said unique binary identification number to said master in a bit-by-bit manner, said slave continuing transmission of said information only during receipt of acknowledgments of each bit from said master.

2. The system of claim 1, wherein said at least one slave provides said information representative of bits of said unique binary identification number to said master during a plurality of time windows, each of said plurality of time windows having first and second time periods, said first time period of each time window starting simultaneously with its corresponding time window and ending before its corresponding time window, said second time period of each time window starting after said first time period of each window has ended and said second time period of each time window ending simultaneously with its corresponding time window, said at least one slave providing said information (i) within said first time period of said plurality of time windows to designate bits having a first binary value, and (ii) within said second time period of said plurality of time windows to designate bits having a second binary value.

3. The system of claim 2, wherein said master sends an acknowledgment to said at least one slave within a predetermined time after receiving information representative of a bit of said unique binary identification number.

4. The system of claim 1, wherein a first set of one or more slaves provides information representative of a bit of said unique binary identification to said master within a first time period of a time window after receiving said command, said first time period starting simultaneously with said time window and ending before said time window, and wherein a second set of one or more slaves provides information representative of a bit of said unique binary identification to said master within a second time period of said time window after receiving said command, said second time period starting after said first time period has ended and ending simultaneously with said time window, and wherein said first set of one or more slaves receive an expected acknowledgment from said master within a predetermined time period after said first set of one or more slaves provide said information representative of a bit of said unique binary identification, and said second set of one or more slaves entering an idle state after not receiving an expected acknowledgment from said master within a predetermined time period after said second set of one or more slaves provide said information representative of a bit of said unique binary identification.

5. The system of claim 4, wherein said time window starts a predetermined time after said command is sent by said master.

6. The system of claim 4, wherein one slave of said first set of one or more slaves provides information representative of bits of said one-slave's unique binary identification number to said master during subsequent time windows, each of said subsequent time windows having first and second time periods, said first time period of each said subsequent time window starting simultaneously with its corresponding time window and ending before its corresponding time window, and said second time period of each said subsequent time window starting after said first time period of each said subsequent time window has ended and said second time period of each said subsequent time window ending simultaneously with its corresponding time window, said one slave providing said information bit-by-bit during said subsequent time windows until said one slave's complete unique binary identification number has been provided to said master.

7. The system of claim 6, wherein each of said subsequent time windows begins at a predetermined time after said one slave of said first set of one or more slaves has provided information representative of a bit of its unique binary identification to said master during the immediately prior time window.

8. The system of claim 6, wherein said one slave of said first set of one or more slaves does not respond to subsequent commands by said master to provide a unique binary identification number unless said one slave has left and re-entered said field of coverage.

9. The system of claim 6, wherein each remaining slave in said field of coverage provides its complete unique binary identification number to said master after said one slave's complete unique binary identification number has been provided to said master, each of said remaining slaves providing its corresponding unique binary identification number bit-by-bit during said subsequent time windows, and wherein each of said remaining slaves is determined by said master as still in said field of coverage and commanded to identify itself.

10. In a communication system having a master communication device and at least one slave communication device, a method for determining if said at least one slave is within a field of coverage and for identifying said at least one slave, said method comprising the steps of:

establishing a field of coverage;

determining if said at least one slave is within said field of coverage, said at least one slave having a binary identification number;

sending a command requesting said binary identification number of said at least one slave; and identifying said at least one slave via transmission of information representative of bits of said unique binary identification number to said master in a bit-by-bit manner, said slave continuing transmission of said information only during receipt of acknowledgments of each bit from said master.

11. The method of claim 10, wherein said information representative of bits of said unique binary identification number is provided during a plurality of time windows, each of said plurality of time windows having first and second time periods, said first time period of each time window starting simultaneously with its corresponding time window and ending before its corresponding time window, said second time period of each time window starting after said first time period of each window has ended and said second time period of each time window ending simultaneously with its corresponding time window, and providing said information (i) within said first time period of said plurality of time windows to designate bits having a first binary value, and (ii) within said second time period of said plurality of time windows to designate bits having a second binary value.

12. The method of claim 11, further comprising the step of providing an acknowledgment within a predetermined time after information representative of a bit of said unique binary identification number has been provided.

13. The method of claim 10, further comprising the step of providing an acknowledgment within a predetermined time period after information representative of a bit of said unique binary identification of a first set of one or more slaves has been provided within a first time period of a time window after said command is sent, said first time period starting simultaneously with said time window and ending before said time window, and intentionally withholding an expected acknowledgment when information representative of a bit of said unique binary identification of a second set of one or more slaves has been provided within a second time period of said time window after said command is sent, said second time period starting after said first time period has ended and ending simultaneously with said time window, and further comprising the step of not providing information representative of bits of said unique binary identification numbers of said second set of one or more slaves during time windows occurring after said acknowledgment has been intentionally withheld.

14. The method of claim 13, wherein said time window starts a predetermined time after said command is sent.

15. The method of claim 13, wherein information representative of bits of the unique binary identification number of one slave of said first set of one or more slaves is provided to said master during subsequent time windows, each of said subsequent time windows having first and second time periods, said first time period of each said subsequent time window starting simultaneously with its corresponding time window and ending before its corresponding time window, and said second time period of each said subsequent time window starting after said first time period of each said subsequent time window has ended and said second time period of each said subsequent time window ending simultaneously with its corresponding time window, said unique binary identification number of said one slave-being provided bit-by-bit during said subsequent time windows until said one slave's complete unique binary identification number has been provided.

16. The method of claim 15, wherein each of said subsequent time windows begins at a predetermined time after information representative of a bit of said unique binary identification number of said one slave has been provided during the immediately prior time window.

17. The method of claim 15, further comprising the step of not responding to subsequent commands to provide the unique binary identification number of said one slave unless said one slave has left and re-entered said field of coverage.

18. The method of claim 15, further comprising the step of providing the complete unique binary identification number of each remaining slave in said field of coverage after said one slave's complete unique binary identification number has been provided, wherein the unique binary identification number of each of said remaining slaves is provided bit-by-bit during said subsequent time windows, and further comprising the steps of determining that said remaining slaves are still in said field of coverage and sending a command requesting the unique binary identification numbers of said remaining slaves.

19. A radio frequency (RF) communication system for determining if at least one object is within a field of coverage and for identifying said object, said system comprising:

a RF communication device having a transmitter and a receiver, said device generating a RF transmission to said field of coverage and transmitting a request signal to determine if there are any objects within said field of coverage;

a tag capable of being affixed to said at least one object, said tag having a transmitter, a receiver and a binary identification number, and said tag receiving said request signal and transmitting a response signal to said communication device to provide said binary identification number to said device in a bit-by-bit manner, continuing transmission of information only during receipt of acknowledgments of each bit from said device; and said device receiving transmissions that are representative of bits of said unique binary identification number and acknowledging said transmissions in a bit-by-bit manner.

20. A method for communicating in a radio frequency (RF) communication system for determining if at least one object is within a field of coverage and for identifying said at least one object, said method comprising the steps of;

generating a RF transmission to said field of coverage and transmitting a request to determine if there are any objects within said field of coverage;

affixing a tag to at least one object, said tag receiving said request and transmitting a response to provide said binary identification number in a bit-by-bit manner, continuing transmission of information only during receipt of acknowledgments of each bit; and receiving transmissions representative of bits of said unique binary identification number and acknowledging said transmissions in a bit-by-bit manner.

* * * * *